United States Patent [19]

McLain, Jr.

[11] Patent Number: 5,956,513
[45] Date of Patent: Sep. 21, 1999

[54] SYSTEM AND METHOD FOR AUTOMATED SOFTWARE BUILD CONTROL

[75] Inventor: John V. McLain, Jr., Colorado Springs, Colo.

[73] Assignee: MCI Communications Corporation, Washington, D.C.

[21] Appl. No.: 08/908,439

[22] Filed: Aug. 7, 1997

[51] Int. Cl.[6] .................................................. G06F 9/44
[52] U.S. Cl. ............................................... 395/705
[58] Field of Search ................................. 395/705

[56] References Cited

U.S. PATENT DOCUMENTS

| | | | |
|---|---|---|---|
| 5,159,687 | 10/1992 | Richburg | 395/703 |
| 5,649,200 | 7/1997 | Leblang et al. | 395/703 |
| 5,748,961 | 5/1998 | Hanna et al. | 395/701 |

Primary Examiner—James P. Trammell
Assistant Examiner—John Q. Chavis

[57] ABSTRACT

An automated computer program application, called an Automated Build Control (ABC) application, provides an improved tool for managing the software build process. ABC uses the specification of a programmer's original program files as input, and automatically identifies all header, include, and other shared library files, which eliminates coding of dependencies. ABC identifies embedded header files, such as those which are referenced in other header files. ABC identifies duplicate headers so future builds can be expedited. ABC ensures all necessary source modules are located and available for compilation, prior to compilation. ABC performs comparisons of date/time stamps and identifies what source modules require recompilation. Essentially, ABC evaluates the compiling and linking processes prior to performing them, thus detecting any potential errors or conflicts before any time and effort is wasted.

22 Claims, 13 Drawing Sheets

```
502  Incpath = D:\Eicon\Toolkit;D:\BorlandC\Include;D:\PxEngine\C
504  Libpath = D:\Eicon\Toolkit;D:\BorlandC\Lib;D:\PxEngine\C
506  Libs = pxengtcl x25tl common_001
508
510  BCCompile = D:\BorlandC\Bin\bcc <source> -ml -2 -C -c -v -Ol -Ob -Oi -d -vi -w-par -w-aus -weas -wpre -I -L
512  //MSCompile =
514  //UNIXCompile =
516  Link = D:\BorlandC/Bin/tlink <obj>,xyz,,<libs> /v /x /c /P- /L
518  //MSLink =
520  //UNIXLink =
522  //LibCmd=D:\BorlandC\Bin\tlib util /0 -+abc3
524  header = xyz.h VerSION=4.2
526  Header = xyzcom.h VERSION=4.2
528  HEADER = xyzdb.hpp version=tip
530  Header = xyzmouse.hpp
532  Header = xyzpopup.h
534  Source = xyzcom.c Version=tip
536  SOURCE = xyz.c
538  Source = xyzdb.c version=3.1
540  Source = xyzui.c Version=3.1
542  source = x25xyz.c Version=tip //Command=[del *.obj]
```

FIG. 5

```
602
604   Header file xyz.h : version #4.2 extracted from PVCS.
606   Header file xyzcom.h : version #4.2 extracted from PVCS.
608   Header file xyzdb.hpp : latest version extracted from PVCS.
610   Header file xyzmouse.hpp: version in current directory used.
      header file xyzpopup.h : version in current directory used.
612
      Source file xyzcom.c : latest version extracted from PVCS.
614
616   xyzcom.c 940428 113652
      OBJ 940504 153842
618
      <x25.h> 900410 150250
      <neterr.h> 900326 164632
      "xyz.h" 930219 090814
      <stdlib.h.> 920610 031000
      <stdio.h.> 920610 031000
      <string.h> 920610 031000
      <alloc.h> 920610 031000
      <bios.h> 920610 031000
      <conio.h> 920610 031000
      <ctype.h> 920610 031000
      <dir.h> 920610 031000
      <dos.h> 920610 031000
      <math.h> 920610 031000
      <direct.h> 920610 031000
      <stdarg.h> 920610 031000
      <stdlib.h> 920610 031000
      <stdio.h> 920610 031000
      <string.h> 920610 031000
      <time.h> 920610 031000
      <sys/timeb.h> 920610 031000
      "xyzcom.h" 930322 163950
      "xyzdb.h" 930209 185818
      "xyzmouse.h" 920911 171138
```

FIG. 6A

620 — Source file xyz.c : version in current directory used.

622 — xyz.c 940428 104734
624 — OBJ 940504 153846

626 — "xyz.h" 930219 090814
<stdlib.h.> 920610 031000
<stdio.h.> 920610 031000
<string.h> 920610 031000
<alloc.h> 920610 031000
<bios.h> 920610 031000
<conio.h> 920610 031000
<ctype.h> 920610 031000
<dir.h> 920610 031000
<dos.h> 920610 031000
<math.h> 920610 031000
<direct.h> 920610 031000
<stdarg.h> 920610 031000
<stdlib.h> 920610 031000
<stdio.h> 920610 031000
<string.h> 920610 031000
<time.h> 920610 031000
<sys/timeb.h> 920610 031000
"xyzdb.h" 930209 185818
"xyzmouse.h" 920911 171138
"xyzpopup.h" 930208 180432

FIG. 6B

628 — Source file xyzdb.c : version #3.1 extracted from PVCS.

630 — xyzdb.c 930218 145604
632 — OBJ 940504 153842

634 —
```
<pxengine.h> 910311 020000
"xyz.h" 930219 090814
<stdlib.h.> 920610 031000
<stdio.h.> 920610 031000
<string.h> 920610 031000
<alloc.h> 920610 031000
<bios.h> 920610 031000
<conio.h> 920610 031000
<ctype.h> 920610 031000
<dir.h> 920610 031000
<dos.h> 920610 031000
<math.h> 920610 031000
<direct.h> 920610 031000
<stdarg.h> 920610 031000
<stdlib.h> 920610 031000
<stdio.h> 920610 031000
<string.h> 920610 031000
<time.h> 920610 031000
<sys/timeb.h> 920610 031000
"xyzdb.h" 930209 185818
```

FIG. 6C

```
636
    Source file xyzui.c : version #3.1 extracted fromPVCS.
638
640  xyzui.c 930219 091232
     OBJ 930219 091232
642
     <pxengine.h> 910311 020000
     "xyz.h" 930219 090814
     <stdlib.h.> 920610 031000
     <stdio.h.> 920610 031000
     <string.h> 920610 031000
     <alloc.h> 920610 031000
     <bios.h> 920610 031000
     <conio.h> 920610 031000
     <ctype.h> 920610 031000
     <dir.h> 920610 031000
     <dos.h> 920610 031000
     <math.h> 920610 031000
     <direct.h> 920610 031000
     <stdarg.h> 920610 031000
     <stdlib.h> 920610 031000
     <stdio.h> 920610 031000
     <string.h> 920610 031000
     <time.h> 920610 031000
     <sys/timeb.h> 920610 031000
     "xyzdb.h" 930209 185818
     "xyzpopup.h" 930208 180432
     "xyzmouse.h" 920911 171138
```

```
Source file x25xyz.c    :latest version extracted from PVCS.

x25xyz.c 930218 145624
OBJ 949594 153900

<x25.h> 900410 150250
"xyz.h" 930219 090814
<stdlib.h.> 920610 031000
<stdio.h.> 920610 031000
<string.h> 920610 031000
<alloc.h. 920610 031000
<bios.h> 920610 031000
<conio.h> 920610 031000
<ctype.h> 920610 031000
<dir.h> 920610 031000
<dos.h> 920610 031000
<math.h> 920610 031000
<direct.h> 920610 031000
<stdarg.h> 920610 031000
<stlib.h> 920610 031000
<stdio.h> 920610 031000
<string.h> 920610 031000
<time.h> 920610 031000
<sys/timeb.h> 920610 031000
"xyzdb.h" 930209 185818

Include path used - d:\eicon\toolkit;d:\borlandc\include;d:\pxengine\c
Library path used - d:\eicon\toolkit;d:\borlandc\lib;d:\pxengine\c
BorlandC compiler being used.
Compile options used - D:\BorlandC\Bin\bcc<source> -ml -2 -C -c -v -OI -Ob -Oi -d -vi- -w-par -w-aus -weas -wpre -I -L
Link options used - D:\BorlandC\Bin\tlink<obj>,xyz,,<libs> /v /x /c /P- /L
Libraries used for link - pxengtcl x25tl mci_021

Startup library used - c01
Runtime library used - cl
Math library used - mathl
```

SYSTEM AND METHOD FOR AUTOMATED SOFTWARE BUILD CONTROL

BACKGROUND OF THE INVENTION

1. Field of the Invention

The following invention relates generally to software build control, and more particularly to a software build control tool that automates the build control process by using the original program files as input and automatically identifies all shared library files.

2. Related Art

The software build process is the process of building executable software modules, also known as software files, from source code modules. It consists primarily of compiling one or more source code modules (i.e., header files and program files, as defined below) into object modules, and then linking and combining the object modules into one or more executable modules.

Source code modules (also known as source modules) consist of those modules that contain a programmer's original source code for an application, referred to as program files, as well as existing modules that contain source code commonly used and shared by many applications, called shared modules. Shared modules are also called header files. In the C/C++ language programming environment, program files are conventionally given a ".c" extension, while header files are conventionally given a ".h" extension.

Header files can be used to specify such information as file formats, standard routines, standard input/output functions, and constants (so that variables can be reset easily without being "hard-coded" in program files). These files are commonly referred to by different nomenclatures depicting the respective functions they perform, such as copy libraries, shared libraries, or include files These may be specific to a vendor's product, or may belong to the public domain.

Essentially, the compilation process includes all modules that contain source code and are to be used to build final executable modules. All source modules, including both original source modules and commonly used shared modules, are compiled into object modules. An object module contains machine instructions that specifically corresponds to the original source code of a source module. In the C/C++ language programming environment, object modules are conventionally given a ".o" or ".obj" extension.

Object modules must be link edited, commonly referred to as "linked," by a link editor program before they can be executed. A link editor program link edits (or "links") object modules to create an executable module. This process includes combining the individual sections of the object modules into one larger object module with four sections, specifically header, program, relocation and symbols sections. A discussion of link editing is provided in Kaare Christian, "The UNIX Operating System", second edition, (John Wiley & Sons, New York, N.Y., 1988).

In most programming languages, executable modules commonly have a filename with an ".exe" extension. Each executable file is specific to an application desired by a programmer.

There are also shared executable modules. For example, Dynamic Link Library (DLL) files are executable modules that reside in shared libraries and are used by a variety of application programs. DLL files typically have a filename with a ".dll" extension. DLL files are commonly used for vendors' communications utilities, user interfaces, and other prevalent applications.

In a typical software development environment, program files and associated header files reside in a developer's library until they are ready to be compiled. These source modules, consisting of program files and associated header modules, are then migrated to a configuration management library. It is from the configuration management library that the software build process takes place. In many of the complex software systems that are built today, hundreds of source modules are compiled into hundreds of object modules for a single application. These object modules are then linked and combined into several executable modules. There are several tasks and considerations involved in the software build process. With so many modules of different types involved, a modification to one module may or may not require a recompilation of one or more other source modules.

One well-known UNIX utility program used in the C/C++ programming language is called "make" (hereinafter "Make"). Make assists in managing the build process. Make provides an interpretive language that can be used to write instructions for compiling and linking. Specifically, Make provides a scripting language that can be used to specify instructions to a compiler and linker.

For example, suppose a programmer wishes to perform a partial compilation by creating an object file called program.o. It should be noted that the compilation is a partial compilation because program.o does not represent the compilation of a complete program, since any complete program must include the function main( ) in the C/C++ programming language. The following instructions of dependencies for Make can be placed in a configuration data file called a Makefile:

```
program.o : program.c header.h
            cc -c program.c
```

When the programmer enters "make" and the name of the Makefile, the Make program reads the above instructions from the Makefile. Here, the Make program is instructed to compile the partial program file program.c and the header file header.h into the partial object module program.o. Similarly, the object module program.o and another object module called program2.o can be combined (or linked) into an executable module named run program.out by providing the following command in the Makefile:

```
run_program.out : program.o program2.o
            cc -o run_program.out program.o program2.o
```

As the above instructions illustrate, programs like Make require a person to manually specify what source modules, including header and other shared library files, are to be compiled and linked. Make does compare date/time stamps of header files, program files, and object modules in order to determine which modules must be updated. For example, if a program file or header file is found to be more recent than an object module, Make will determine this and force a recompile.

However, as shown by the above examples, with Make and programs like it, a user must identify all header files, and other shared library modules, and must also identify which source modules are to be included therewith. This requires more time and effort from the user, and is also subject to user input error. As noted, in a typical software system build, there may be hundreds of program files and header files, as well as hundreds of object modules to deal with.

A compilation error can occur when a program file references a specific header file, but the header file is not included in the configuration data file (e.g., Makefile). This can happen frequently in a large-scale software programming environment, where developers frequently break down a source module into multiple modules. Often, when a source module is broken down, the developers forget to reference a header file in each resulting module or accidentally remove a needed header file from a module. Accordingly, a developer must remember to reprogram the configuration data file, to ensure that the correct dependencies are maintained. However, reprogramming of the configuration data file may be incorrectly performed or entirely forgotten. This is especially likely given that the configuration data file is often maintained by configuration services programmers, versus the development programmers who modify the modules. In addition, the configuration data files for a large-scale software programming environment are frequently quite cumbersome and difficult to follow. Unfortunately, a missing file will likely be discovered only when an entire software build is compiled, with a resulting compilation termination error. However, by this point, much time has already been wasted in an unsuccessful attempt at compiling and linking. Often, the software build is performed overnight, with a resulting loss of a full business day for the developers and testers.

Make and other software build utilities can only use the most recent version of any source module. Often, an earlier version of a source module is needed for compiling and linking, because different development programming groups concurrently modify and test different portions of the applications software.

As an example of a compilation error, suppose a first programmer references a specific header file in a program file, which has already been compiled into an object module. Suppose further that a second programmer modifies the same header file to fix a bug, but by doing so, introduce a new bug into the first programmer's program file. This error will not appear until the first programmer's program file is compiled, linked, executed, and tested. However, by this time the first programmer will be at a loss to determine how the bug was introduced and much time and effort will be wasted in the software build.

In addition, Make and other software build utilities will not detect potential conflicts and errors between the modules. These turn up after the compilation and linking process have failed, or after an executable has been built and tested.

SUMMARY OF THE INVENTION

The present invention is a computer program providing an improved tool for managing the software build process. The tool uses the specification. of a programmer's original program files as input, and automatically identifies all header and other shared library files. It identifies embedded header files, which are header files referenced in other header files. The tool ensures all necessary source modules are located and available for compilation, prior to compilation. It also performs comparisons of date/time stamps and identifies what source modules require recompilation. The tool also performs syntax checking on the commands to invoke compilers and linkers. Essentially, the tool evaluates the compiling and linking processes prior to performing them, thus detecting any potential errors or conflicts before any time and effort is wasted.

The following is a more detailed view of the present invention. The invention is directed to a system and method for automating a software build. A listing of modules, including program files, header files and object modules, along with information relating to a compilation of the modules, is provided to a user before the compilation and linking steps are performed. The software build tool reads a configuration data file to determine the versions of the modules required for compilation and the locations of these modules. These locations include a project library and one or more third party shared libraries. The tool scans each program file to determine the identity of each header file listed in each program file. If a header file is not specified in the configuration data file, then the tool searches for the most recent version of the header file in the libraries specified by the configuration date file. If a header file is specified in the configuration data file, then the tool searches for the specified version of the header file in the libraries specified by the configuration date file. The tool generates an internal table listing the modules along with the information relating to the compilation of the modules and optionally presents the internal table to a user as a results report.

When the libraries specified by the configuration data file are searched, if a header file is not located in the project library or in the third party shared libraries, then the tool lists an unresolved conflict error message for the header file in the internal table. However, if a header file is located in the project library or in the third party shared libraries, then the tool indicates that the header file was located in the internal table. The tool can display the unresolved conflict error message immediately upon detection to a user. The tool can list the name of the header file, the version of the header file and the location wherein the header file is located in the internal table.

The tool lists the name of each header file and a date/time stamp for each header file in the internal table. It also determines whether any additional header files are embedded in each header file.

If it is determined that there are additional embedded header files, the tool first determines the name of each embedded header file. If a specified version of an embedded header file is not indicated in the configuration data file, then the most recent version of the embedded header file is searched in the project library or in the third party shared libraries. However, if a specified version of the embedded header file is indicated in the configuration date file, then the specified version of the embedded header file is searched in the project library or in the third party shared libraries.

If an embedded header file is not located in the project library or in the third party shared libraries, then an unresolved conflict error message for the embedded header file is listed in the internal table, in addition to the name of the embedded header file and a string of flag characters. If the embedded header file is located in the project library or in the third party shared libraries, then (1) the name of the header file and a date/time stamp for the header file are listed in the internal table, (2) if there are any header files embedded in the embedded header files, then the above steps are repeated until every header file corresponding to the program file is located. It should be noted that these steps are repeated for all the layers of embedded header files, so all the header files embedded at different levels are determined.

The tool also searches for each program file referenced in the configuration data file in the project library or in the third party shared libraries. If a program file is not located, then an unresolved conflict error message for the program file, characters identifying the program file and a string of flag characters are listed in the internal table. However, if the program file is located, then characters identifying the program file and a date/time stamp for the program file are listed in the internal table. The tool can also display the unresolved conflict error message immediately upon detection to a user.

The tool also determines the name of an object module corresponding to each program file. It searches for the object module in the project library or in the third party shared libraries. If the object module is not located, then an unresolved conflict error message, a string of characters representing the object module and a string of flag characters are listed in the internal table. However, if the object module is located, then a string of characters representing the object module and a date/time stamp for the object module are listed in the internal table. The tool can also display the unresolved conflict error message immediately upon detection to a user.

The tool can also determine duplicate listings of header files, which result in wasteful compilations. It searches the internal table to obtain a complete list of all of the header files for the software build and identifies any header files appearing more than one time. It then lists an unresolved conflict error message in the internal table for any header files appearing more than one time.

The tool also performs date/time stamp comparisons between the modules to determine when a program file must be updated (compiled), and when the program file need not be compiled. This is accomplished by comparisons of the date/time stamps for the modules, which indicate when a module was created. If the date/time stamp of the program file is greater in value than the date/time stamp of an object module corresponding to the program file, then the tool identifies the program file for recompilation. In addition, if the date/time stamp of the header file is greater in value than the date/time stamp of an object module corresponding to the header file, then the tool identifies the program file for recompilation.

FEATURES AND ADVANTAGES

Unlike traditional build design tools, which require that the user specifies the dependencieis of every header and shared library file (including header files embedded in other header files), as well as the dependencies of every object module being compiled into an executible module, the instant invention reduces the manual input required by the user. The user simply states what program files are to be compiled. The software build tool then searches for all header and other shared library files that need to be included in compilation and linkage.

The software build tool has a look ahead approach to the compilation and linkage processes, identifying potential configuration errors and conflicts prior to actually performing compilation and linkage. For example, the invention informs the user when program files, header files, and object modules are not located before the compilation and linkage takes place. This allows the user to resolve such errors and conflicts before attempting a compilation and linkage process that can otherwise fail. As a result, the invention provides the user great savings in time because errors are detected and made known to the user early on in the process.

Conventionally, an error or conflict can arise because a program file is not compiled when required. For example, often an embedded header file is modified to fix a bug, but only after a source module that uses it has been compiled into an object module. In this case, the object module does not incorporate the latest changes to the header file. On the other hand, it is possible that a program file is compiled unnecessarily, because the corresponding object module is already the most recent version. The software build tool automatically determines when it is or it is not necessary to compile a program file by comparing the date/time stamps of the program files with the header files they reference, as well as the date/time stamps of the program files with the object modules they reference. Moreover, the user is made aware of what will be compiled before the compilation and linkage processes, providing the user needed information early on.

Another advantage of the software build tool is that it identifies duplicate header files. Without the instant invention, if a header or other shared library file is specified twice or more by a programmer in a source module, a compiler will open, read, and compile that header file for as many times as it is specified. This wastes processing time and resources. The invention identifies duplication prior to compilation.

Traditional build control tools use only the most recent versions of source modules. However, if the most recent version of a source module is still under development, a user may wish to use an earlier version that is known to be error free. The invention allows a user to specify a specific version of all source modules, including header and other shared library files.

BRIEF DESCRIPTION OF THE FIGURES

The invention is best understood by reference to the figures wherein references with like reference numbers indicate identical or functionally similar elements. The elements within the figures are functional entities and may or may not be separate physical entities.

FIG. 5 is a sample configuration data file.

FIGS. 6A, 6B, 6C, 6D and 6E together represent a single results report, including table entries for program files, object modules and header files.

DETAILED DESCRIPTION OF THE PREFERRED EMBODIMENTS

I. Example Implementation

The instant invention can be described in terms of a straightforward example environment. The example environment is a "C/C++" language programming environment. For example, the disclosure uses the terms header files and include files to refer to source modules that contain common source code shared and used by one or more different applications.

Although the invention is described in terms of this example environment, description in these terms is provided for convenience only. It is not intended that the invention be limited to the application in this example environment. In fact, after reading the following description, it will become apparent to a person skilled in the relevant art how to implement the invention in alternative environments. The same concepts and techniques as used for the instant invention can be used for other environments. For example, the invention can be implemented in a "COBOL" language programming environment, wherein the invention can use common shared source modules referred to by other terms, such as copy libraries and sub-programs.

Therefore, for the remainder of the specification the C/C++ development example is described only for exemplary purposes and not by way of limitation to the invention.

II. Definitions

A. Module: A module is a software component. Commonly, a module is a single file containing source code.
B. Source module: A source module is any module that contains source code and is input to the compilation process. Program files, header files, and other shared library files are all referred to as source modules before these modules have been compiled.
C. Program file: A program file is a source module that contains a programmer's original source code that is specific to an application.
D. Header file: A header file is a source module that contains common source code that is shared and used by one or more different applications. A program file will often contain one or more references to a header file for reuse of standard routines and functions.
E. Object module: An object module is a module that contains source code that has been compiled into machine language understood by a computer, but has not been linked with other object modules, nor is yet executable.
F. Executable module: An executable module is a module of executable computer code, generally a result of linking and grouping multiple object modules. To execute an application (i.e., to run an application) an application user can type the name of the executable module and press the enter key, or instead click on an icon, which will have the same result.

III. A System Architecture and Overview

Figure 1:
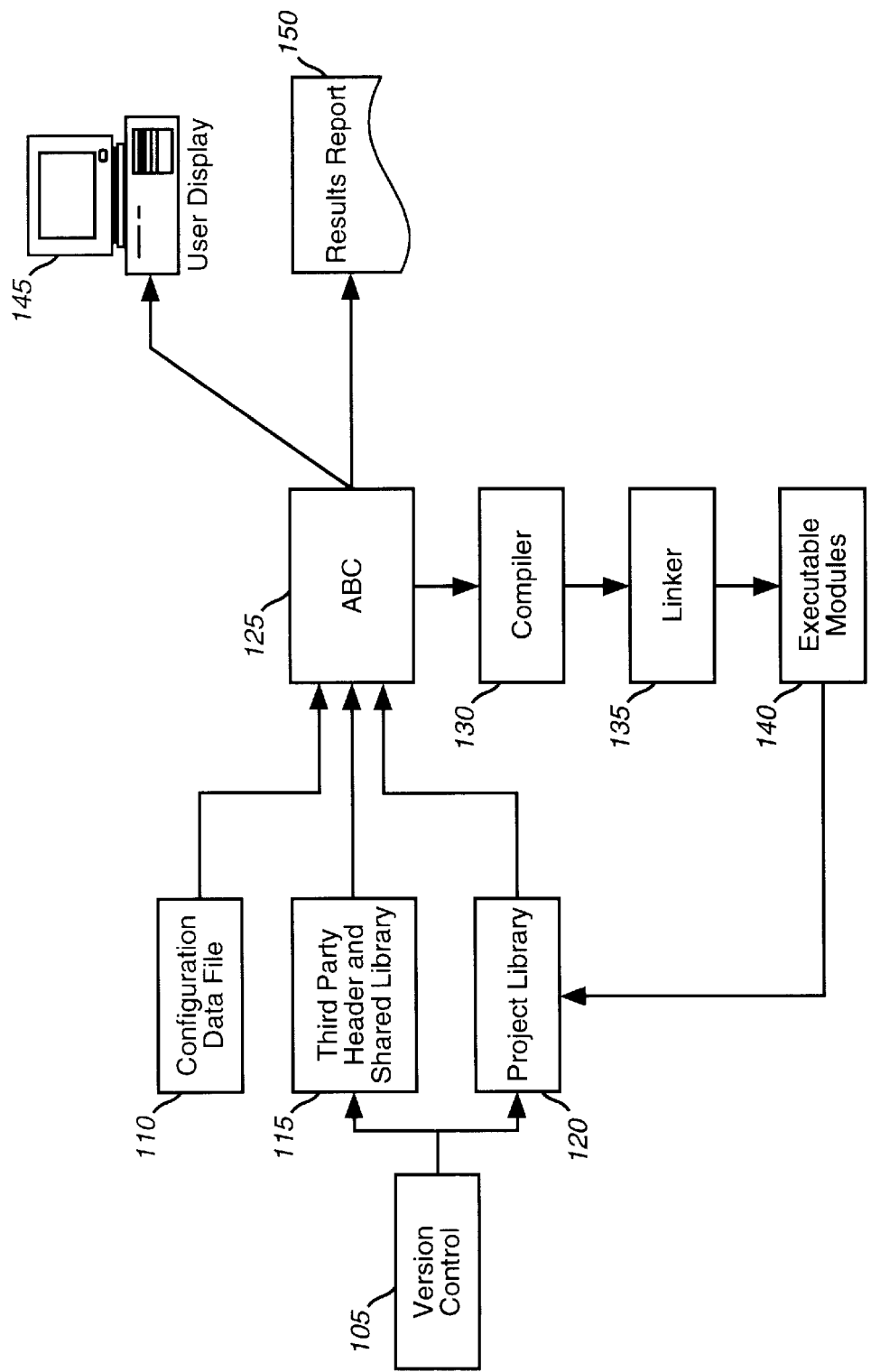
FIG. 1 is a block diagram illustrating a system architecture of the instant invention.

FIG. 1 is a block diagram illustrating the systems architecture of the preferred embodiment. FIG. 1 includes version control 105, configuration data file (CDF) 110, third party header and shared library 115, project library 120, automated build control (ABC) 125, compiler 130, linker 135, executable modules 140, user display 145 and results report 150.

The present invention is embodied as ABC 125, which is an executable program on a computer of any type. ABC 125 receives as input CDF 110. CDF 110 is a text file that is created by a user and input to ABC 125. It contains the instructions for the software build process. Specifically, the CDF 110 identifies each program file to be compiled, versions other than the most recent for header files, and commands for invoking a compiler and a linker.

A sample CDF 110 is shown in FIG. 6. Those of ordinary skill will appreciate the brevity of CDF 110, in comparison to known configuration data files for a software build process, such as a Makefile for a UNIX operating system. These other configuration data files require many times more data, including specifying each source module (including all program files and header files) that must be compiled, as well as specifying the dependencies between source modules and header files. The CDF 110 is explained in further detail in section IV.

After ABC 125 has received and read the CDF 110, it retrieves the specified source modules from a project library 120. The project library 120, which represents the configuration management library, contains all of the program files (source code) for a specific application or project. It also contains header files that were developed by the application programmer specifically for use by the associated program files. In essence, the project library 120 is a local directory used to store all source modules that are to be compiled and linked to build one or more executable modules for a specific application.

There may be additional header files, and other shared library files, that are referenced by source modules in the project library 120, but are not contained in the project library 120 itself. These files are contained in other libraries, represented in FIG. 1 by third party header and shared library 115. These latter files include files used for a third party product, such as a communications package or a user interface, such as a graphical user interface (GUI). These files can also include files that are common to many different applications and therefore reside in a library that is not specific to any particular application.

One or more of the source modules that are retrieved from the project library 120 can reference the third party header and shared library 115. After ABC 125 reads the CDI 110 and identifies each source module, it reads each source module and scans for all required header files.

The CDF 110 will specify the location in which the header files reside, even though it does not need to specify the header files themselves. ABC 125 will identify from the source modules every header file, and will retrieve these from either the project library 120 or from the third party header and shared library 115. ABC 125 will then read each header file and identify any embedded header files. Embedded header files are header files referenced in other header files. ABC 125 will then retrieve these embedded header files from either the project library 120 or the third party header and shared library 115.

Multiple versions of a source module are managed by version control system 105. Version control system 105, which can be a feature of ABC 125 or of the processor used (though illustrated separately), is associated with any project library 120 or third party header and share library 115 to select from various versions of each source module. The user can specify within the CDF 110 which version of any source module, including both program files and header files, must be compiled. By default, version control system 105 will use the most recent version of any source module. However, if a specific version of a source module is specified in CDF 110, version control system 105 will require the compiler 130 and linker 135 to respectively compile and link the specified version in place of the most recent version.

ABC 125 can retrieve any object module from the project library 120. Object modules are source modules that have already been compiled, and are used if the corresponding source modules have not been changed since the last compilation process. ABC 125 can also retrieve any object module from the third party header and share library 115.

Once ABC 125 has read the CDF 110 and retrieved all of the necessary source modules (including program files and header files) and object modules, it performs a number of functions to detect any potential conflicts or errors. By performing these functions prior to compiling, time and effort that would otherwise be wasted in an unsuccessful compilation and linkage process, are saved. ABC 125 also detects conflicts (e.g., when a header file is modified after a source module has been compiled into an object module) that otherwise would not appear until the testing phase. These conflict checks produce even greater time savings. These functions include date/time stamp comparisons, location of all necessary program files and header files, command syntax checking, and duplicate header file checking, which are detailed in the sections below.

If ABC 125 detects any potential error or conflict, it will notify the user by sending a message to user display 145. It will also prompt the user whether or not to proceed with compiling. The user can opt to proceed with compiling to the extent that is feasible or possible, or can instead opt to terminate and resolve any potential conflicts.

If the user opts to continue when a potential conflict or error is detected, or if instead no potential conflicts or errors are detected, then ABC 125 will invoke compiler 130 and linker 135 to perform compiling and linking, respectively. As recognized by those of ordinary skill, numerous compiling and linking utilities are available on the market for accomplishing the tasks required of compiler 130 and linker 135. ABC 125 invokes compiler 130 and linker 135 using commands included in CDF 110. However, ABC 125 performs syntax checking on these commands first, to ensure a syntax error will not cause the process to terminate after it has proceeded.

The compiler 130 compiles the source modules into object modules. The linker 135 links the object modules and combines them into one or more executable modules 140. Executable modules 140 can then be placed in project library 120 for future execution (i.e., for "running" the application).

ABC 125 will produce results report 150, which is a report of all the results of the compilation process. This results report 150 will also include any error messages that were generated. In the present invention, the term "error" is used to refer to (1) the traditional usage of the term, including a halt in processing that requires operative intervention before processing is continued, and (2) the notion of a warning, including the issuance of an alert signal to an operator, providing the option to discontinue processing. The results report 150 can be produced via any standard means. ABC 125 can send the report to a printer for a hard copy, to a file for soft copy, to an e-mail system for e-mail distribution, to a fax system for faxing, or to a user display 145 for on-line viewing. FIGS. 7A–7E illustrate a sample results report 150. Calculation of the results report is explained in section VI below.

IV. The Configuration Data File

FIG. 6 is a sample configuration data file, namely CDF 110, for the instant invention. FIG. 6 has sections 602–642 with each section representing a line of information that is recognized by ABC 125. It should be noted that CDF 110 includes information for the C/C++ programming language running in a UNIX operating system environment, although those of ordinary skill will recognize it is easily adaptable to other programming languages and other operating systems.

The sections identifying the program file source modules are located toward the lower portion of CDF 110. Specifically, sections 632, 634, 636, 638 and 640 identify the source modules that must be compiled and linked into executable modules. For example, section 632 identifies source module "xyzcom.c" as one source module that must be compiled.

Optionally, next to the identified source modules the programmer can identify version control parameters. For example, next to "xyzcom.c" is listed the statement "Version=tip." The parameter "tip" indicates that the latest version of "xyzcom.c" is to be compiled. Since ABC 125 automatically selects the most recent version as a default option, specifying the parameter "tip" is unnecessary. For example, in section 634 no version control parameter is specified and ABC 125 automatically selects the most recent version of "xyz.c." In section 636, however, "3.1" is selected as the version control parameter for "xyzdb.c." Therefore, for the program file "xyzdb.c", the 3.1 version will be selected by version control 105 instead of the most recent version of the file. It should also be noted that a "source" and "version" parameter can be specified in any combination of small case and capital case letters.

The ability to select the desirable version of any source module is important, especially in a complex programming environment. At any point in time, developers in different teams can modify different areas of code. Suppose that a first development team modifies "xyzdb.c" such that the latest version of the file in project library 120 has never been run or tested for accuracy. If a second development team later modifies "xyzcom.c," it will be desirable to run the executable module in an environment without the recent changes to "xyzdb.c." Therefore, by specifying that the 3.1 version of "xyzdb.c" is to be compiled, the second development team ensures that the changes provided by the first development team will not hinder its efforts in running and testing "xyzcom.c."

One important function of ABC 125 is the ability to read the source modules, shown in sections 632–640, and to determine therefrom the header files that must be included in the compilation. As recognized by those of ordinary skill, this can be accomplished by means of a text search for key words. For example, in the C/C++ programming language, a header file is identified by an "include" statement, as follows:

include <header_file_name.h> or include "header_file_name.h"

where header_file_name.h is the name of the header file desired. ABC 125 can search for the "#include" key word in order to identify a header file. For embedded files, ABC 125 can similarly search for key words in header files, themselves. This latter operation can be performed recursively, so that header files embedded in other header files, which are still further embedded in other header files, etc., are exhaustively searched for key words.

In sections 622, 624, 626, 628 and 630, header files can be specified in CDF 110. As noted, it is unnecessary for a software developer to indicate which header files to include in the compilation, because ABC 125 will automatically read the header files from the source modules. However, the developer can specify the header file in CDF 110 in order to specify a version control parameter. In this regard, the version control parameters specified in sections 622–630 for the header files function in the same manner as the version control parameters for the source modules described above.

As with source modules, for header files ABC 125 automatically selects the most recent version of the header files as a default option. Sections 628 and 630, which specify header files "xyzmouse.hpp" and "xyzpopup.h", respectively, do not specify any version control parameters, which indicates that the most recent version of the header files will be compiled. Section 626 specifies header file "xyzdb.hpp" with a version control parameter set to "tip." Hence, the most recent version of "xyzdb.hpp" will also be compiled.

Since ABC 125 automatically selects the most recent version of the header files by a key word search in the source module text files, entries 626, 628 and 630 for files "xyzmouse.hpp", "xyzpopup.h" and "xyzdb.hpp", respectively, are not required in CDIN 110. This is the case because even if these header files were not specified in CDF 110, ABC 125 would have determined these header files to be required for the compile by performing a key word search for all "include" statements in the source modules. On the other hand, sections 622 and 624 (for files "xyz.h" and "xyzcom.h") are required in the CDF 110, because their version control parameters require that the 4.2 versions of the files be used in place of the most recent versions.

Section 602 at the top of CDF 110 is an "include path" designated "Incpath." Incpath is the full directory path of each source module that is not in the local directory. In other words, section 602 designates source modules located in third party header and shared library 115. The sub-library D:\Eicon\Toolkit is the third party communications library for source modules. In this communications library reside specialized communications source modules for providing connectivity between applications and communications hardware (e.g., for communicating with other devices). The sub-library D:\BorlandC\Include is the third party library where the generic header files reside. The sub-library D:\PxEngine\C is the third party library where the database interface source modules reside, which are source modules required to interface with a database application.

Section 604 is a "library path" designated "Libpath." Libpath is the full directory path of each object module that is not in the local directory, meaning those object modules located in third party header and shared library 115. These object modules have already been compiled, and may be linked with other compiled object modules to generate executable modules. The sub-library D:\Eicon\Toolkit is the third party communications library for object modules (as well as for communications source modules). The sub-library D:\BorlandC\Lib is the third party library where the compiler is located. The sublibrary D:\PxEngine\C is the third party library where the database interface object modules are located (as well as where the database interface source modules are located).

Section 606, defined as the parameter "Libs," indicates the names of the third party object modules themselves. For example, x25tl is the name of the object module located in the third party communications library D:\Eicon\Toolkit. Similarly, pxengtcl is the name of the object module located in the third party database interface library D:\PxEngine\C. Finally, common_001 is the name of an object module located in a default directory, which is used by the source modules.

Section 608 is a compile command understood by ABC 125 and the compiler 130. The instant example uses the Borland™ C/C++ compiler, although those of ordinary skill will recognize that the invention is not limited by the type of compiler used. ABC 125 will substitute the names of the source modules in the "<source>" field. The letters preceded by hyphens, e.g., "-ml", "2", "-C", etc. are optional parameters recognizable to compiler 130. Hence, ABC 125 transmits the compile command specified in section 608 to compiler 130 by substituting the source modules (indicated by sections 632–640) therein. Fields 610 and 612 have commands that are commented out, serving as place holders for Microsoft™ C/C++ and UNIX C/C++ compile commands. (In the C/C++ programming language, any string preceded by double slashes will not be read by the compiler.) These fields can be used in the event the software is migrated, for example, to either a Microsoft™ C/C++ or a UNIX C/C++ environment. For example, if the software is migrated to a UNIX C/C++ environment, sections 608 and 610 will be commented out, and section 612 will be "uncommented" and completed appropriately.

Likewise, section 614 is a link command understood by ABC 125 and the linker 130, which in this case is a Borland™ C/C++ linker, although those of ordinary skill will recognize that the invention is not limited by the type of linker used. In addition to specifying the parameters required by the Borland™ C/C++ linker at the right of the command (e.g., "/v", "/x", etc.), and the linker library at the left of the command, the command also specifies the field "<libs>". ABC 125 will substitute the names of the object modules specified in section 606 in the "<libs>" field. The command also provides the name of the executable module that will be created, which is "xyz." Fields 616 and 618 have commands that are commented out, serving as place holders for Microsoft™ C/C++ and UNIX C/C++ linker commands. These fields can be used in the event the software is migrated, for example, to either a Microsoft™ C/C++ or a UNIX C/C++ environment.

Section 620, which is commented out, represents another method of compiling and linking for Borland™ C/C++. This command gives the user the flexibility to create an executable module, a "dll" module (an object module commonly used for vendors' communications utilities, user interfaces, and other prevalent applications), or a regular object module. Because of the link command specified in section 614, the "LibCmd" specified in section 620 is not needed in CDF 110 and is therefore commented out.

The last section of CDF 110, which is commented out, is section 642. Section 642 specifies a command that is a "door" into the operating system after the build is completed. In other words, this command is readily transferred and accepted by the operating system. In CDF 110, section 642 specifies that the "obj" files (having the file extension ".obj") are to be deleted after the build is completed. However, the command has no effect because it is commented out.

V. The ABC Process

Figure 2:
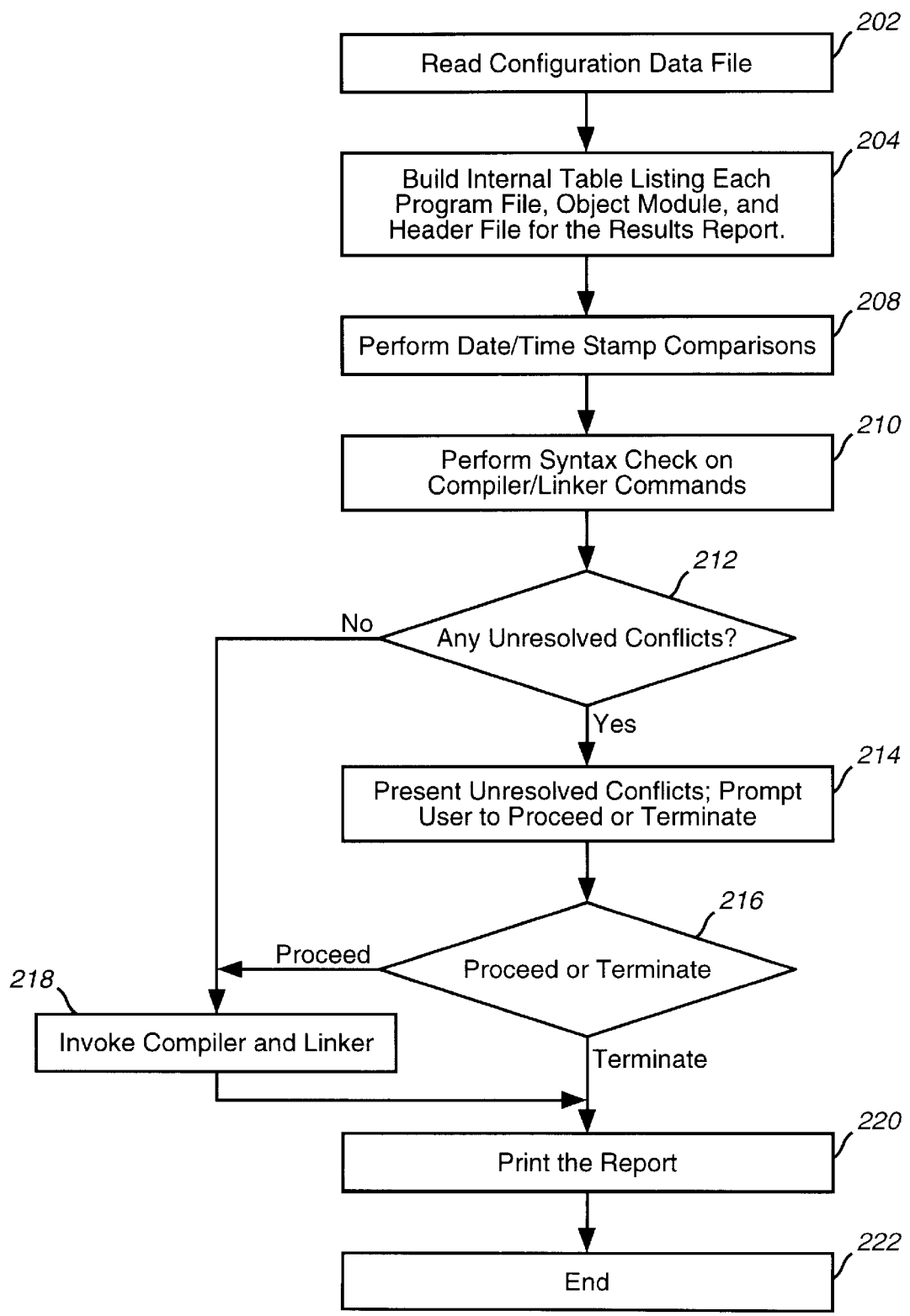
FIG. 2 is a flowchart illustrating the overall process performed by the Automated Build Control device of the instant invention.

FIG. 2 is a flowchart illustrating the overall process performed by ABC 125. This process is invoked when a user inputs CDF 110 to ABC 125. The process can be invoked by any user, including for example, members of a configuration management team, a development team, or a testing team.

In step 202, ABC 125 reads the CDF 110. CDF 110 is a text file described in section IV above. A sample of CDF 110 is illustrated in FIG. 6.

In step 204, ABC 125 builds an internal table that lists each program file, object module and header file, along with its relevant date/time stamp, to optionally inform the user of when each respective file was created. The internal table refers to temporary data stored in the memory of the computer that embodies ABC 125, and will later be produced in a viewable form in results report 150. FIGS. 7A–7E illustrate a sample results report 150 corresponding to CDF 110 of FIG. 6.

Figure 3A:
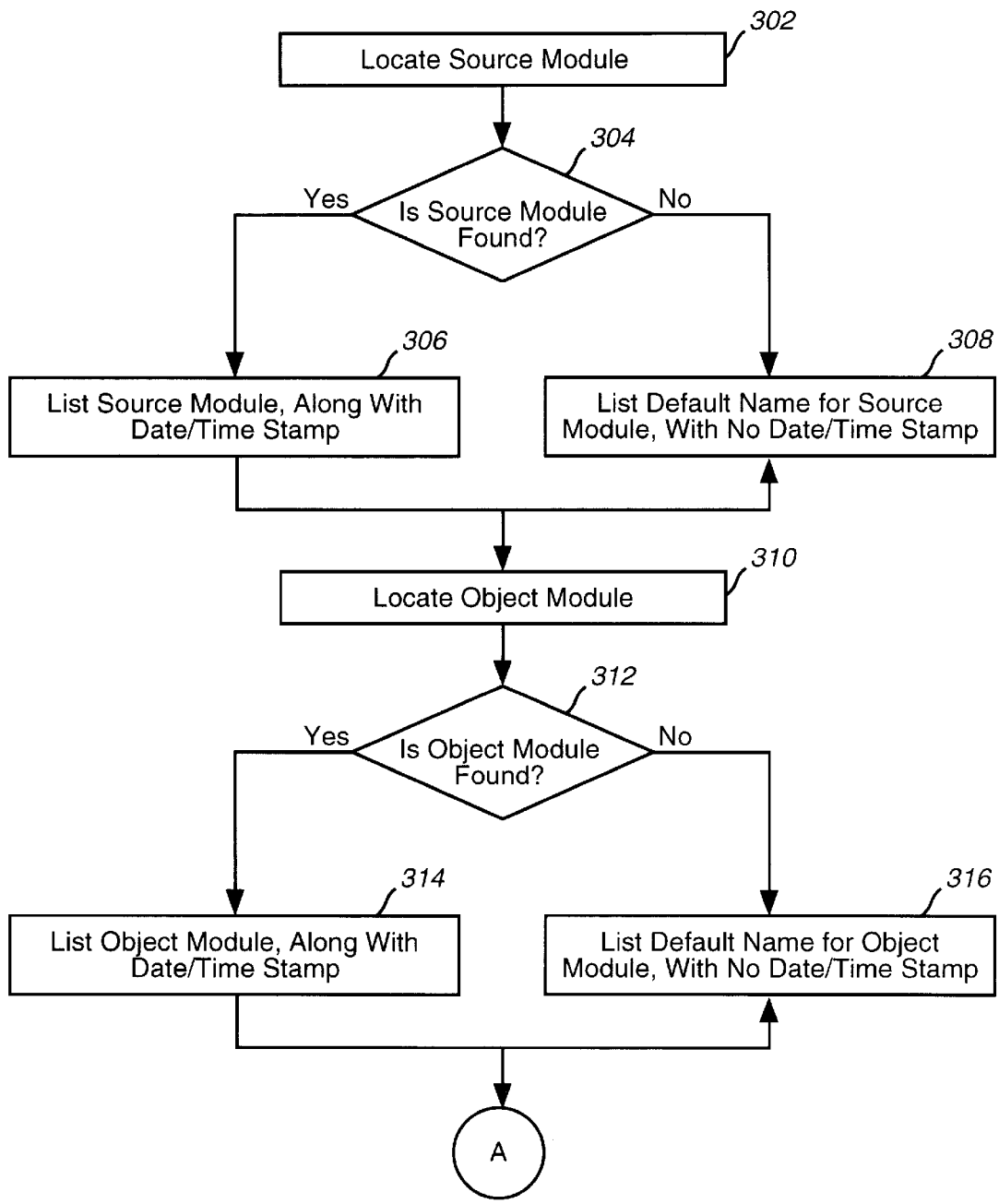
FIGS. 3A, 3B, and 3C are flowcharts detailing the completion of table entries for each program file, object module and header file for a results report.
Figure 3B:
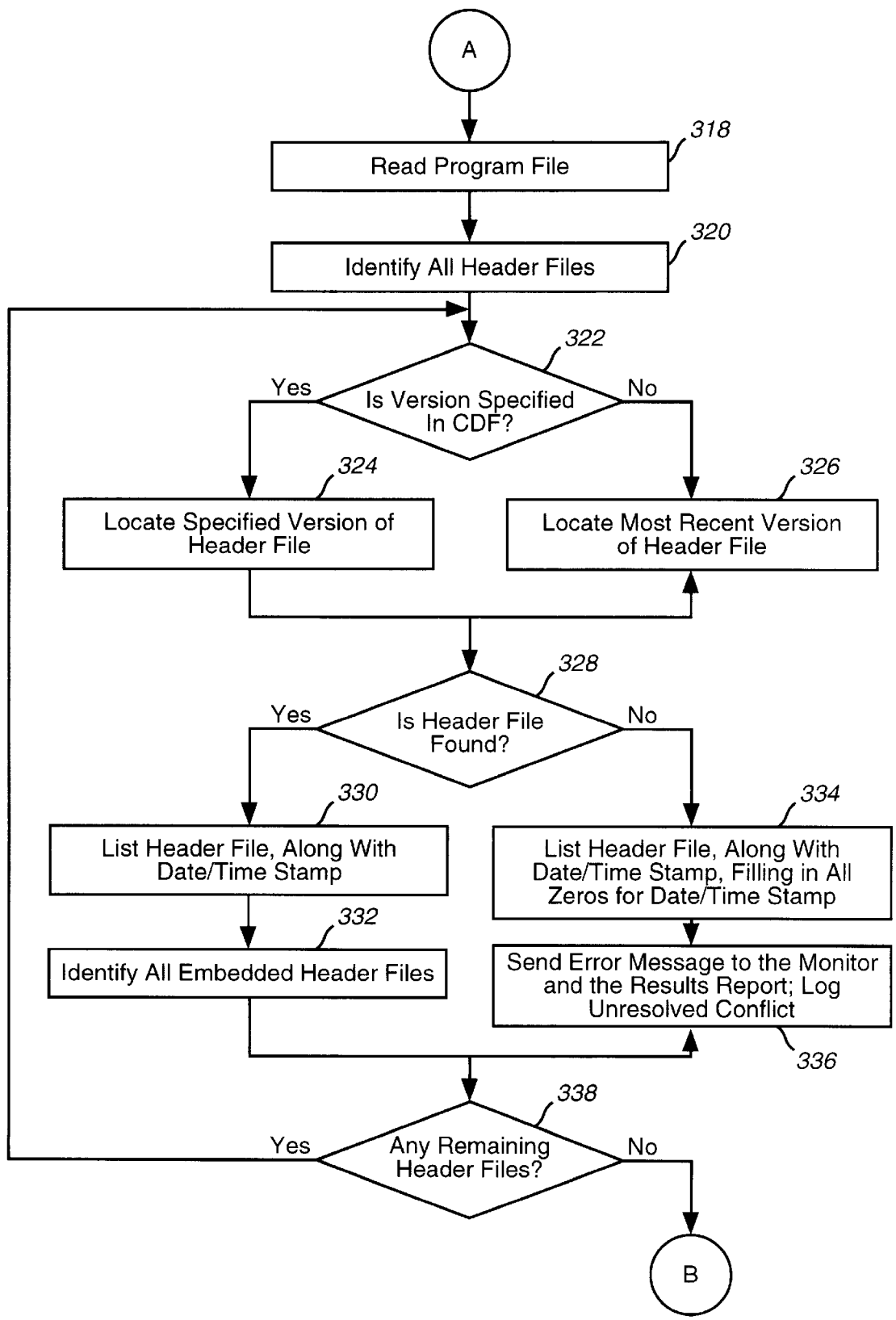
Figure 3C:
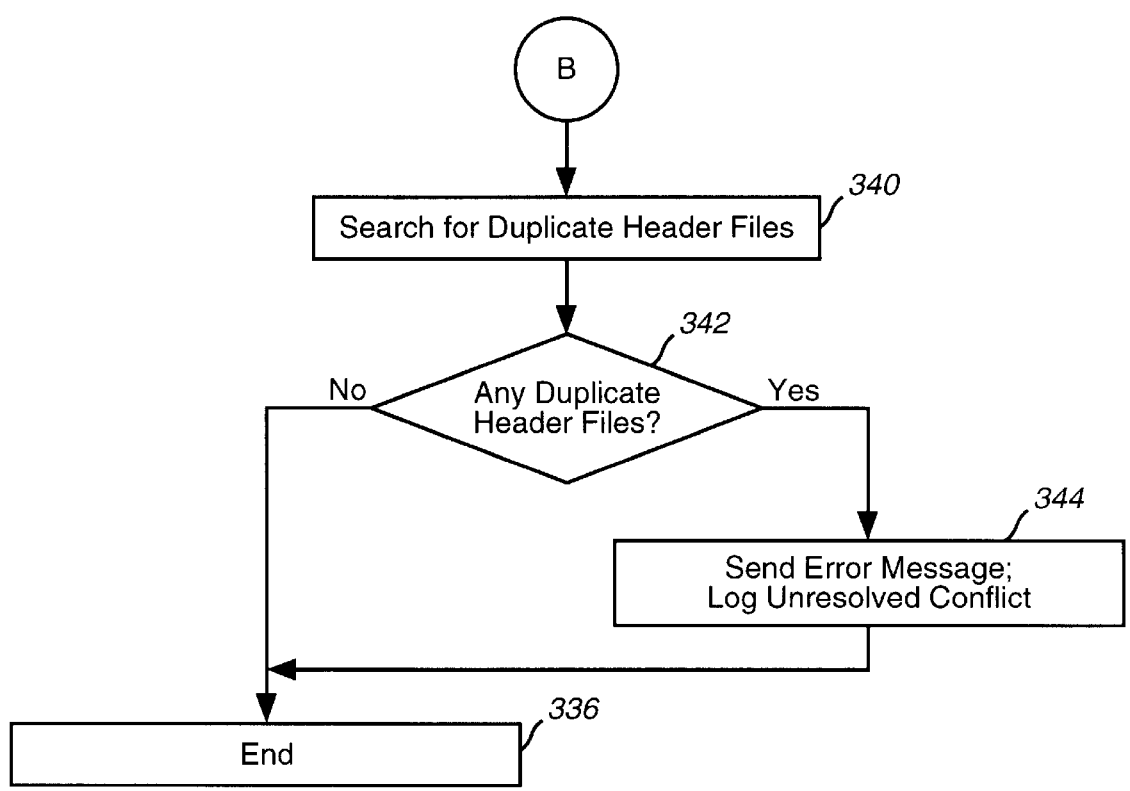

ABC 125 completes table entries in the internal table for each program file, including the object module and header files associated with each program file. The process is illustrated in FIGS. 3A–3C and described in detail in section VI. The process is performed for each program file, and is repeated until tables entries for all program files are completed. During this step, error messages may be generated and sent to the results report 150 and/or the user display 145. Also during this step, any potential error or conflict that is detected is logged. All detected errors and conflicts are then presented to the user in step 214 below.

Figure 4:
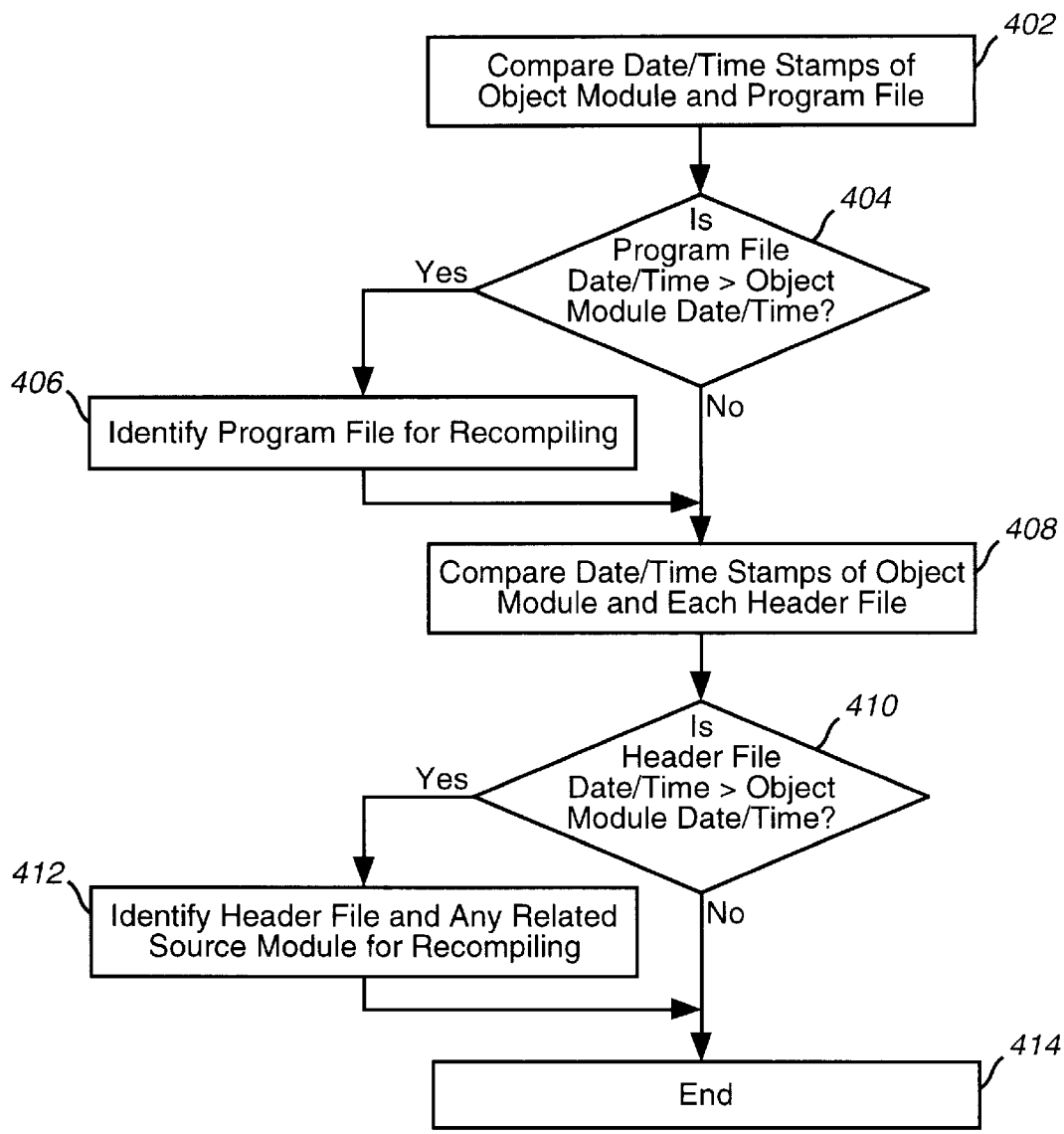
FIG. 4 is a flowchart detailing the performance of date/time stamp comparisons for the table entries for each program file.

In step 208, ABC 125 performs date/time stamp comparisons between the object modules and the program files, and between the object modules and the header files. This process is illustrated in FIG. 4 and described in detail in section VII. Date/time stamp comparisons are performed in order to determine which source modules are required to be recompiled.

In step 210, ABC 125 performs a syntax check on the commands that invoke the compiler 130 and the linker 135. Since these commands are included in the CDF 110 by a user, they are subject to syntax error. ABC 125 checks the syntax in this step so that any errors will be brought to the user's attention prior to submitting to the compiler 130 and linker 135. The user is informed of any syntax errors in step 214 below.

In step 212, it is determined whether any unresolved conflicts were detected in steps 206 through 210. If not, then in step 218, ABC 125 invokes the compiler 130 and linker 135 with the commands from the CDF 110.

However, if in step 212 unresolved conflicts are detected, then in step 214 these unresolved conflicts are presented to the user. The unresolved conflict can be presented to the user via display 145, or any other known fashion recognized by those of ordinary skill in the art. ABC 125 also prompts the user to specify whether or not to proceed with compiling. The user may opt to proceed with compiling as much as possible, or the user may opt to terminate and try to resolve the conflicts. Steps 202–214 are performed quickly. For example, for a program having thousands of lines of code, these steps can be performed within a matter of seconds. Because the user is informed of these errors quickly rather than after (or during) the compilation and linking steps, significant time is saved.

In step 216, the user can opt to proceed despite errors or conflicts, so that in step 218 compiler 130 and linker 135 are invoked. Alternatively, the user can opt to terminate the software build, wherein results report 150 is printed in step 220.

The compiling and linking process of step 218 is also performed if no unresolved conflicts are detected in step 212. The process of compiling the source modules into object modules, and of linking the object modules into executable modules will be recognized by those of ordinary skill, in light of the improvements described in the sections that follow. ABC 125 invokes the compiler 130 and linker 135 with the commands from the CDF 110. After step 218, results report 150 is printed in step 220. The overall process ends in step 222.

VI. Calculation of the Results Report

FIGS. 3A, 3B and 3C are flow charts illustrating step 204, namely how an internal table is generated that lists the program files, header files and object modules used in the software build, in addition to other important information. FIGS. 7A, 7B, 7C, 7D, 7E and 7F illustrate results report 150 in detail, which is a viewable (e.g., printed) version of this internal table. Since the internal table will resemble the later-generated results report 150, below FIGS. 7A–7E are used to describe the contents of the internal table.

Figure 7:
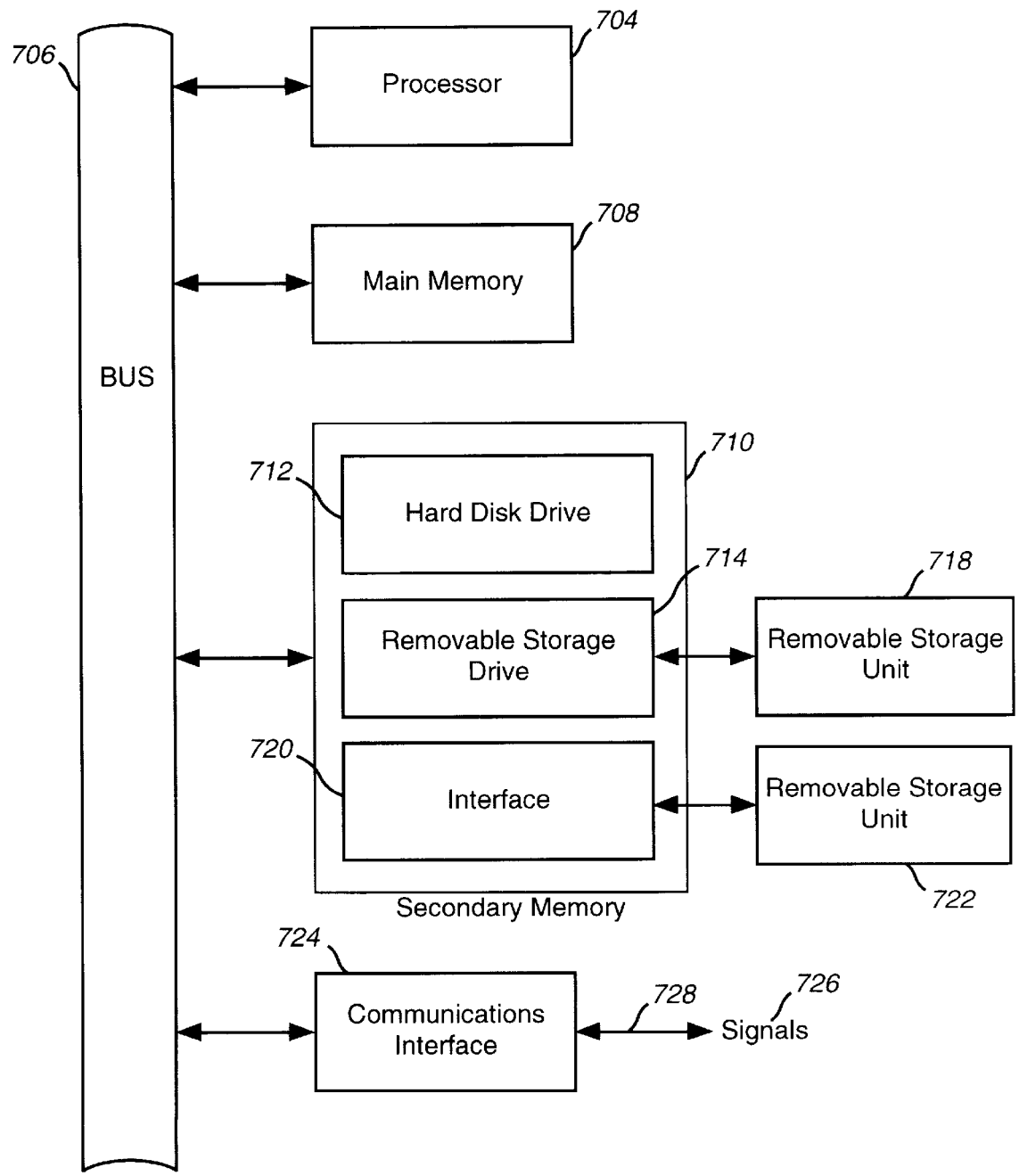
FIG. 7 illustrates a block diagram of a computer useful for implementing elements of the present invention.

Referring to FIG. 3A, in step 302 the header files directly retrieved from CDF 110 are listed, as shown in FIG. 7A. The project library 120 and the third party header and shared library 115 are sequentially searched for these header files. If the header files are located, then as shown in sections 702, 704, 706, 708 and 710, the header files, the versions of the header files used, and location from which the header files were extracted are indicated. These header files are the same files as those shown in FIG. 6. For example, in section 702, it is specified that the 4.2 version of header file xyz.h was extracted from third party header library SL1. In section 710, it is specified that latest version of header file xyz-popup.h was extracted from the current directory. If the header files are not located, then optionally ABC 125 can log an unresolved conflict error message, which can be displayed to the user immediately or in step 214. In addition, the unresolved conflict error message can be listed in the results report 150.

In step 304, ABC 125 locates the first program file retrieved from CDF 110 and lists the program file, along with its version and location. Referring to FIG. 6, the first source module entry in CDF 110 is xyzcom.c. ABC searches for xyzcom.c in the project library 120. Specifically, ABC searches for the latest version of the file xyzcom.c in project library 120 using version control 105. The file xyzcom.c is listed in section 712, including the version of the program file and the location from which the actual program file is retrieved. Here, section 712 specifies that the latest version of the program file xyzcom.c was retrieved from project library PL1.

In step 306, ABC 125 determines whether the program file xyzcom.c is found. If in step 306 program file xyzcom.c is found, then in step 308 the program file is listed in the results report 150, including a date/time stamp for the -file. Whenever a module is created, whether a source module, an object module, or an executable module, the system determines the date it was created and the time of the day during which it was created, and associates an appropriate date/time stamp for the module. Referring to FIG. 7A, the file xyzcom.c is listed along with its date/time stamp in section 714. (940428 represents the date Apr. 28, 1994, while 113652 represents the time 11:36:52.)

If in step 306, the program file is not found, then in step 310 the program file is listed with the date/time stamp replaced by zeros in results report 150. This indicates to the person viewing the results report that the program file was not located, from which a decision can be made to recompile the files. Optionally, ABC 125 can log an unresolved conflict error message, which can be displayed to the user immediately or in step 214. In addition, the unresolved conflict error message is listed in the results report 150.

In step 312, ABC 125 locates an object module generated from the program file by compilation. By default, the object module is created having the same name as the program file, but with an extension ".obj" in place of ".c." Here, the default name for the object module compiled from program file xyzcom.c is xyzcom.obj. ABC 125 searches project library 120 for the file xyzcom.obj. It should be noted that CDF file 10 can also include a different name for the object module for a given program file than the default name, which name will be detected by ABC 125.

If in step 314 the object module is located, then in step 316 the object module is listed along with its date/time stamp. Referring to FIG. 7A, the characters "obj" (signifying the object file xyzcom.obj) are listed in section 716, along with the date/time stamp indicating when the object module was created.

If in step 314 the object module is not located, then in step 318 either the default name of the object module (i.e., xyzcom.obj) or the characters "obj" are listed, along with a date/time stamp set to zeros, indicating that the object module was not located. This does not necessarily represent any type of error. The use of this date/time stamp is demonstrated in section VII below.

Referring to FIG. 3B, in step 320 all of the header files for the source module are identified. In a C/C++ language programming environment, the header files are identified for the compiler near the beginning of the program and are specified using the "#include" command. (Refer to section IV above.) In this example, ABC 125 opens the source module xyzcom.c and performs a text search for the #include statements having the form:

include <header_file_name.h> or
include "header_file_name.h"
where header_file_name.h is the name of the header file.

In step 322, ABC 125 searches CDF 110 for the first header file referenced by xyzcom.c in order to determine whether a specific version of any header file is to be used in place of the most recent version. As shown in sections 622–630 of FIG. 6 the 4.2 version of the header files xyz.h and xyzcom.h are to be used, whereas the most recent versions of all other header files are to be used.

If in step 322 a version of the first header file referenced by source module xyzcom.c other than the most recent version is specified, then in step 324 the specified version is located. ABC 125 will first search project library 120 for any such version-specified header files. The project library 120 is the same as the working directory in the instant example. Next, ABC 125 will search any third party header and shared library 115 for any such version-specified header files. This latter category of libraries is specified by the "Incpath" command of CDF 110 in the instant example, shown as section 602 in FIG. 6.

If in step 322 no version of the first header file referenced by source module xyzcom.c is specified, then in step 326 the most recent version of the header file is automatically located. Here, the same locations as specified in step 324 (namely, project library 120 and third party header and shared library 115) are sequentially searched for the most recent version of the header file.

If in step 328 the header file was found, then in step 330 the header file is listed along with its date/time stamnp, indicating when the header file was created. As shown in section 718 of FIG. 7A, the first header file listed is x25.h, with its appropriate date/time stamp. Then in step 332, ABC 125 identifies all embedded header files. It reads the header file that it found in step 324 or step 326, and determines if any additional header files are referenced in the header file itself. If any additional header files are referenced therein, then ABC 125 performs steps 320–330 repeatedly until all embedded header files are located and listed. It also possible that header files are additionally embedded in the embedded header files, themselves, etc. Accordingly, ABC will search for all header files embedded within the first header file, no matter how deeply embedded. These header files are listed with their respective date/time stamps.

If in step 328 ABC 125 camnot find the header file, then in step 334 the header file is listed with a date/time stamp set to zero. In addition, in step 336 ABC 125 logs an unresolved conflict error message, which can be displayed to the user immediately or in step 214. In addition, the unresolved conflict error message is listed in the results report 150.

In step 338, steps 320–336 are repeated for the remainder of the header files referenced in the program file. Here, every header file located in program file xyzcom.c, including embedded header files located within the header files, is located and listed in section 718 of results report 150, as shown in FIG. 7A. For the header files not located, an unresolved conflict error message is logged, which can be displayed to the user immediately or in step 214. In addition, the unresolved conflict error message is listed in the results report 150.

In step 340, ABC 125 determines whether there are any remaining program files in CDFI 110. If in step 340 it is determined that there are no remaining program files, then the process is continued in FIG. 3C. On the other hand, if there are any remaining program files, then steps 302–338 are repeated. FIGS. 7B–7E respectively illustrate the resulting listings for the program files shown in sections 634–640 of FIG. 6.

Referring to FIG. 3C, in step 350 ABC 125 searches the list of all header files and identities any duplicates. A duplicate header file occurs when, for example, a header file referenced in the source module is also referenced in an embedded header file. Such duplicate header files waste valuable compilation time.

If in step 352 no duplicates are found, then the calculation of results report 150 is ended in step 356. On the other hand, if in step 352 duplicate header files are found, then in step 354 ABC 125 logs an unresolved conflict error message, which can be displayed to the user immediately or in step 214. In addition, the unresolved conflict error message is listed in the results report 150. Although compilation can proceed successfully with duplicate headers, it is considered wasteful. ABC 125 permits the user to determine whether it is worthwhile to remove duplicate references to header files. After step 354, calculation of the results report is ended in step 356.

As shown in sections 752, 754, 756, 758, 760, 762, 764, 766 and 768 of FIG. 7E, in a preferred embodiemnt ABC 125 will list relevant information from CDF 110 for an audit trail, as shown in FIG. 6. This information was discussed in section IV above.

VII. Performing Date/Time Stamp Comparisons

FIG. 4 is a flow chart illustrating step 208, namely the performance of date/time comparisons in order to determine whether a program file must be compiled. The process shown in FIG. 4 is performed for each program file identified from CDF 110 by ABC 125, as shown in FIG. 6.

In step 402. for each program file and its corresponding object module, it is determined which of the files was created at a later date and time by its date/time stamp. It should be noted that ABC performs the date/time stamp analysis before the user runs a new software build, including new compilation and linking steps.

If in step 404 it is determined that a program file has a later date/time stamp than its corresponding object module, then the object module is the result of an earlier compilation and the program file must be recompiled. This is performed in step 406.

On the other hand, if in step 404 it is determined that the program file has an earlier date/time stamp than its corresponding object module, then the object module correctly corresponds to the program file and there is a likelihood that the program file need not be recompiled, depending upon the date/time stamps of the corresponding header files. (This is discussed below.) For example, referring to FIG. 7A, the program file xyzcom.c was created on Apr. 28, 1994, whereas the corresponding object module was created (i.e., compiled from the program file) on May 4, 1994. Therefore, it is safe to assume that the object module xyzcom.obj is a compiled version of xyzcom.c.

However, it is still possible that a header file was updated after the corresponding object module was compiled from the program file, even though the object module appears to be the correct compiled version of the program file. In this case, it is necessary to recompile the program file anyway. If in step 410 any header files referenced in the program file are determined to have date/time stamps after the datc/time stamp of the object module, then in step 412 the header file and program file are identified for recompilation.

The process is ended in step 414.

VIII. An Implemenitation of the Invention

In one embodiment, the invention, specifically ABC 125, is directed to a computer system operating as discussed herein. An exemplary computer system 802 is shown in FIG. 8. The computer system 802 includes one or more processors, such as processor 804. The processor 804 is connected to a communication bus 806.

The computer system 802 also includes a main memory 808, preferably random access memory (RAM), and a secondary memory 810. The secondary memory 810 includes, for example, a hard disk drive 812 and/or a removable storage drive 814, representing a floppy disk drive, a magnetic tape drive, a compact disk drive, etc. The removable storage drive 814 reads from and/or writes to a removable storage unit 818 in a well known manner.

Removable storage unit 818, also called a program storage device or a computer program product, represents a floppy disk, magnetic tape, compact disk, etc. As will be appreciated, the removable storage unit 818 includes a computer usable storage medium having stored therein computer software and/or data.

Computer programs (also called computer control logic) are stored in main memory and/or the secondary memory 810. Such computer programs, when executed, enable the computer system 802 to perform the features of the present invention as discussed herein. In particular, the computer programs, when executed, enable the processor 804 to perform the features of the ABC 125. Accordingly, such computer programs represent controllers of the computer system 802.

In another embodiment, ABC 125 is directed to a computer program product comprising a computer readable medium having control logic (computer software) stored therein. The control logic, when executed by the processor 804, causes the processor 804 to perform the functions of the invention as described herein.

In another embodiment, ABC 125 is implemented primarily in hardware using, for example, a hardware state machine. Implementation of the hardware state machine so as to perform the functions described herein will be apparent to persons skilled in the relevant art(s).

IX. Conclusion

While the invention has been particularly shown and described with reference to preferred embodiments thereof, it will be understood by those skilled in the relevant art that various changes in form and details may be made therein without departing from the spirit and scope of the invention.

X. Appendix

A reference manual for the automated software build control tool is included as an appendix, which is incorporated herein in its entirety by reference.

What is claimed is:

1. A method for automating a software build, said method comprising:

(1) reading a configuration data file that provides a listing of modules, including program files header files and object modules, in order to determine which versions of said modules are required for compilation and the respective locations thereof, wherein said locations include a project library and one or more third party shared libraries;

(2) scanning each said program file to determine an identity for each header file listed in each said program file;

(3) if an identified header file is not specified in said configuration data file, then searching for a most recent version of said identified header file in said project library and said third party shared libraries specified by said configuration date file;

(4) if said identified header file is specified in said configuration data file, then searching for said specified version of said header file in said project library and said third party shared libraries specified by said configuration date file;

(5) generating an internal table listing said modules along with information relating to the compilation of said modules.

2. A method according to claim 1, further comprising:

(a) if said identified header file is not located in said project library or in said third party shared libraries, then listing an unresolved conflict error message for said identified header file in said internal table;

(b) if said identified header file is located in said project library or in said third party shared libraries, then indicating that said identified header file was located in said internal table.

3. A method according to claim 2, wherein step (a) further comprises displaying said unresolved conflict error message immediately upon detection thereof to a user.

4. A method according to claim 2, wherein step (b) further comprises listing the name of said identified header file, the version of said identified header file and the location wherein said identified header file is located in said internal table.

5. A method according to claim 2, wherein step (b) further comprises:

listing the name of said identified header file and a date/time stamp for said identified header file in said internal table;

determining whether any additional header files are embedded in said identified header file.

6. A method according to claim 5, wherein if it is determined that there are additional header files embedded in said identified header file, then said method further comprises:

(a) determining a name of each said embedded header file;

(b) if a specified version of a said embedded header file is not indicated in said configuration data file, then searching for a most recent version of said embedded header file in said project library or in said third party shared libraries;

(c) if a specified version of said embedded header file is indicated in said configuration date file, then searching for the specified version of said embedded header file in said project library or in said third party shared libraries;

(d) if said embedded header file is not located in said project library or in said third party shared libraries, then listing an unresolved conflict error message for said embedded header file, said name of said embedded header file and a string of flag characters in said internal table;

(e) if said embedded header file is located in said project library or in said third party shared libraries, then said method further comprises:

(i) listing a name of said embedded header file and a date/time stamp for said embedded header file in said internal table;

(ii) if there are any additional header files embedded in said embedded header files, then repeating steps (a) through (e) until every header file corresponding to said program file is located.

7. A method according to claim 1, further comprising:

(a) searching for each said program file referenced in said configuration data file in said project library or in said third party shared libraries;

(b) listing, for each said program file not located in said project library or in said third party shared library, an unresolved conflict error message, characters identifying said not located program file and a string of flag characters in said internal table;

(c) listing, for each said program file located in said project library or in said third party shared library, characters identifying said located program file and a date/time stamp in said internal table.

8. A method according to claim 7, wherein step (b) further comprises displaying said unresolved conflict error message immediately upon detection thereof to a user.

9. A method according to claim 7, further comprising:

(a) determining for each said located program file a name of a corresponding object module;

(b) searching for each said object module in said project library or in said third party shared libraries;

(c) listings for each said object module not located in said project library or in said third party shared library, an unresolved conflict error message, characters representing said not located object module and a string of flag characters in said internal table;

(d) listing, for each said object module located in said project library or in said third party shared library, characters representing said located program file and a date/time stamp in said internal table.

10. A method according to claim 9, wherein step (c) further comprises displaying said unresolved conflict error message immediately upon detection thereof to a user.

11. A method according to claim 2, further comprising:

searching said internal table to obtain a complete list of all of said header files for the software build and identifying any header files appearing more than one time therein;

listing an unresolved conflict error message in said internal table for any header files appearing more than one time therein.

12. A method according to claim 1, further comprising:

identifying a said program file for recompilation if a date/time stamp of said program file is greater in value than a date/time stamp of a said object module corresponding to said program file;

identifying a said program file for recompilation if a date/time stamp of said identified leader file is greater in value than a date/time stamp of a said object module corresponding to said identified header file.

13. A system for automating a software build, said system comprising:

means for reading a configuration data file that provides a listing of modules, including program files, header files and object modules, in order to determine which versions of said modules are required for compilation and the respective locations thereof, wherein said locations include a project library and one or more third party shared libraries;

means for scanning each said program file to determine an identity for each header file listed in each said program file;

means for searching for a most recent version of an identified header file in said project library and said third party shared libraries specified by said configuration date file if said identified header file is not specified in said configuration data file;

searching for a specified version of said identified header file in said project library and said third party shared libraries specified by said configuration date file if said identified header file is specified in said configuration data file;

means for generating an internal table listing said modules along with information relating to the compilation of said modules.

14. A system according to claim 13, further comprising:

means for listing an unresolved conflict error message for said identified header file in said internal table, if said identified header file is not located in said project library or in said third party shared libraries;

means for indicating that said identified header file was located in said internal table, if said identified header file is located in said project library or in said third party shared libraries.

15. A system according to claim 14, further comprising:

means for listing the name of said identified header file, the version of said identified header file and the location wherein said identified header file is located in said internal table.

16. A system according to claim 14, further comprising:

means for listing the name of said identified header file and a date/time stamp for said identified header file in said internal table;

means for determining whether any additional header files are embedded in said identified header file.

17. A system according to claim 16, further comprising:

means for determining the name of a header file embedded in said identified header file;

means for searching for a most recent version of said embedded header file in said project library or in said third party shared libraries if a specified version of said embedded header file is not indicated in said configuration data file;

means for searching for the specified version of said embedded header file in said project library or in said third party shared libraries if a specified version of said embedded header file is indicated in said configuration date file;

means for listing an unresolved conflict error message for said embedded header file, said name of said embedded header file and a string of flag characters in said internal table, if said embedded header file is not located in said project library or in said third party shared libraries;

wherein if said embedded header file is located in said project library or in said third party shared libraries, then said system further comprises:

means for listing a name of said embedded header file and a date/time stamp for said embedded header file in said internal table.

18. A system according to claim 13, further comprising:

means for searching for each said program file referenced in said configuration data file in said project library or in said third party shared libraries;

means for listings for each said program file not located in said project library or in said third party shared library, an unresolved conflict error message, characters identifying said not located program file and a string of flag characters in said internal table;

means for listing, for each said program file located in said project library or in said third party shared library, characters identifying said located program file and a date/time stamp in said internal table.

19. A system according to claim 18, further comprising:

means for determining for each said located program file a name of a corresponding object module;

means for searching for each said object module in said project library or in said third party shared libraries;

means for listing, for each said object module not located in said project library or in said third party shared library, an unresolved conflict error message, characters representing said not located object module and a string of flag characters in said internal table;

means for listing, for each said object module located in said project library or in said third party shared library, characters representing said located program file and a date/time stamp in said internal table.

20. A system according to claim 14, further comprising:

means for searching said internal table to obtain a complete list of all of said header files for the software build and identifying any header files appearing more than one time therein;

means for listing an unresolved conflict error message in said internal table for any header files appearing more than one time therein.

21. A system according to claim 13, further comprising:

means for identifying a said program file for recompilation if a date/time stamp of said program file is greater in value than a date/time stamp of a said object module corresponding to said program file;

means for identifying, a said program file for recompilation if a date/time stamp of said identified header file is greater in value than a date/time stamp of a said object module corresponding to said identified header file.

22. A system for automating a software build, said system comprising:

a configuration data file that includes versions of each module required for compilation and locations of each said module, wherein said locations include a project library and one or more third party shared libraries, said modules including program files, header files and object modules;

a scanning device, wherein said scanning device scans each said program file to determine the identity of each header file listed in each said program file;

a searching device, wherein said searching device searches for a most recent version of each said header file in said libraries specified by said configuration date file, if said header file is not specified in said configuration data file, or searches specified version of a said header file in said libraries specified by said configuration date file if said header file is specified in said configuration data file;

generation device, wherein said generation device generates an internal table listing each said module along with information relating to the compilation of each said module.

* * * * *